United States Patent [19]

Nakamura et al.

[11] Patent Number: 5,610,630
[45] Date of Patent: Mar. 11, 1997

[54] GRAPHIC DISPLAY CONTROL SYSTEM

[75] Inventors: Hiroshi Nakamura; Katsuhiko Nishikawa, both of Kawasaki, Japan

[73] Assignee: Fujitsu Limited, Kawasaki, Japan

[21] Appl. No.: 584,156

[22] Filed: Jan. 11, 1996

Related U.S. Application Data

[63] Continuation of Ser. No. 62,531, May 18, 1993, abandoned.

[30] Foreign Application Priority Data

| | | | |
|---|---|---|---|
| Nov. 28, 1991 | [JP] | Japan | 3-315007 |
| Oct. 8, 1992 | [JP] | Japan | 4-269006 |
| Apr. 1, 1993 | [JP] | Japan | 5-074914 |

[51] Int. Cl.⁶ ............................... G09G 5/14
[52] U.S. Cl. .................. 345/119; 345/201; 395/340
[58] Field of Search ............... 345/1, 2, 3, 119, 345/120, 200, 201, 189, 190, 132, 157, 156, 133; 395/157, 164

[56] References Cited

U.S. PATENT DOCUMENTS

| | | | |
|---|---|---|---|
| 4,439,762 | 3/1984 | Van Vliet et al. | 345/201 |
| 4,668,994 | 5/1987 | Takahashi et al. | 345/201 |
| 4,990,904 | 2/1991 | Zenda | 345/3 |
| 5,029,112 | 7/1991 | Sakamoto et al. | 345/201 |
| 5,101,365 | 3/1992 | Westberg et al. | 345/119 |
| 5,111,190 | 5/1992 | Zenda | 345/3 |
| 5,287,121 | 2/1994 | Louis et al. | 345/156 |
| 5,440,680 | 8/1995 | Ichikawa et al. | 345/157 |

FOREIGN PATENT DOCUMENTS

| | | | |
|---|---|---|---|
| 01225990 | 9/1989 | Japan | 345/200 |
| 01287695 | 11/1989 | Japan | 345/201 |
| 1319788 | 12/1989 | Japan | 345/201 |
| 02059797 | 2/1990 | Japan | 345/201 |
| 03067294 | 4/1991 | Japan | 345/2 |
| 3171087 | 6/1991 | Japan | 345/201 |
| 3131898 | 6/1991 | Japan | 345/201 |

*Primary Examiner*—Richard Hjerpe
*Assistant Examiner*—Lun-Yi Lao
*Attorney, Agent, or Firm*—Staas & Halsey

[57] ABSTRACT

A graphic display control system performs multi-window display at a workstation or the like. The graphic display control system comprises image display means whose display screen is composed of a plurality of pixels or character sections; at least two image storage means each of which has a storage capacity for one display screen of the image display means; two image selection information storage means which store image selection information for selecting one of the at least two image storage means for one pixel or one character section composing one display screen of the image display means; selection information output means which selects one of the two image selection information storage means and outputs the image selection information stored in the selected image selection information storage means; and image selection output means which selects one of the at least two image storage means for one pixel or one character section on the basis of the image selection information outputted by the selection information output means, and outputs the image information stored at the pixel position or character position corresponding to the selected image storage means to the image display means.

2 Claims, 11 Drawing Sheets

GRAPHIC DISPLAY CONTROL SYSTEM

This application is a continuation of application Ser. No. 08/062,531, filed May 18, 1993, now abandoned.

BACKGROUND OF THE INVENTION (1) Field of the Invention

The present invention relates to a graphic display control system which performs multi-window display at a workstation or the like.

(2) Description of the Related Art

In a system in which a plurality of workstations are connected to a LAN or to other networks, a workstation acting as a display server sometimes displays the information sent from a plurality of workstations on the same screen. In such a case, information is generally displayed so that one window corresponds to each workstation from which information is sent, by means of a multi-window system.

Figure 1:
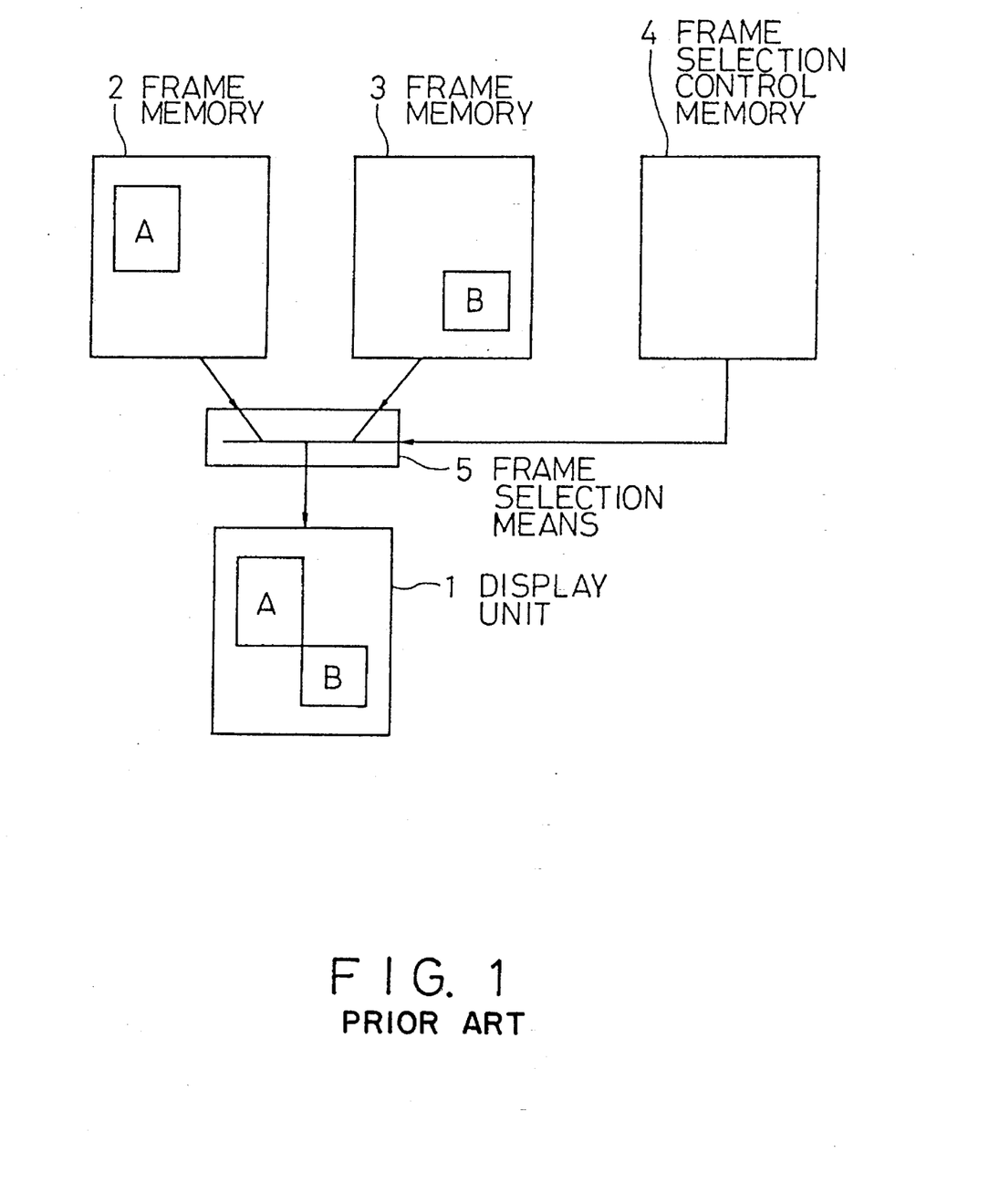
FIG. 1 is a schematic of a conventional display control system which performs multi-window display.

FIG. 1 shows a schematic configuration of a conventional graphic display control system which performs multi-window display. Each of frame memories 2 and 3 has a memory capacity for one screen and retains display information for each window. A frame selection control memory 4 stores frame selection information, for each pixel or charaction section, as to which of frame memories 2 and 3 should be selected. A frame selection means 5 selects one of the data read out from the frame memories 2 and 3 on the basis of the frame selection information read out from the frame selection control memory 4, and sends it to the display unit 1 for display. Thus, the frame selection information is read out from the frame selection control memory 4 for each pixel or character section, and either of the data of frame memories 2 and 3 is outputted on the basis of the frame selection information. Therefore, for example, the partial image A written in the frame memory 2 and the partial image B written in the frame memory 3 are simultaneously displayed on the display unit I as window A and window B on the same screen, by which multi-window display can be realized.

The frame selection information stored in the frame selection control memory 4 is updated in the blanking period of the display units synchronization signal. When updating speed is low and updating does not end in the aforementioned blanking period, the image on the display screen of display unit 1 becomes out of order, so that the image is difficult to watch and/or decipher.

When an image is generated at a workstation or the like which is used for computer graphics, the output result is usually displayed on a display unit at the workstation. However, there is also a desire that the output result be displayed on a conventional TV set or recorded by a video tape recorder (VTR) for presentation or the like. In such case, it is necessary that the workstation output an image signal for TV viewing which has a different synchronization system such as, for example, an image signal of NTSC system, in addition to the display signal outputted to the display unit.

Figure 2:
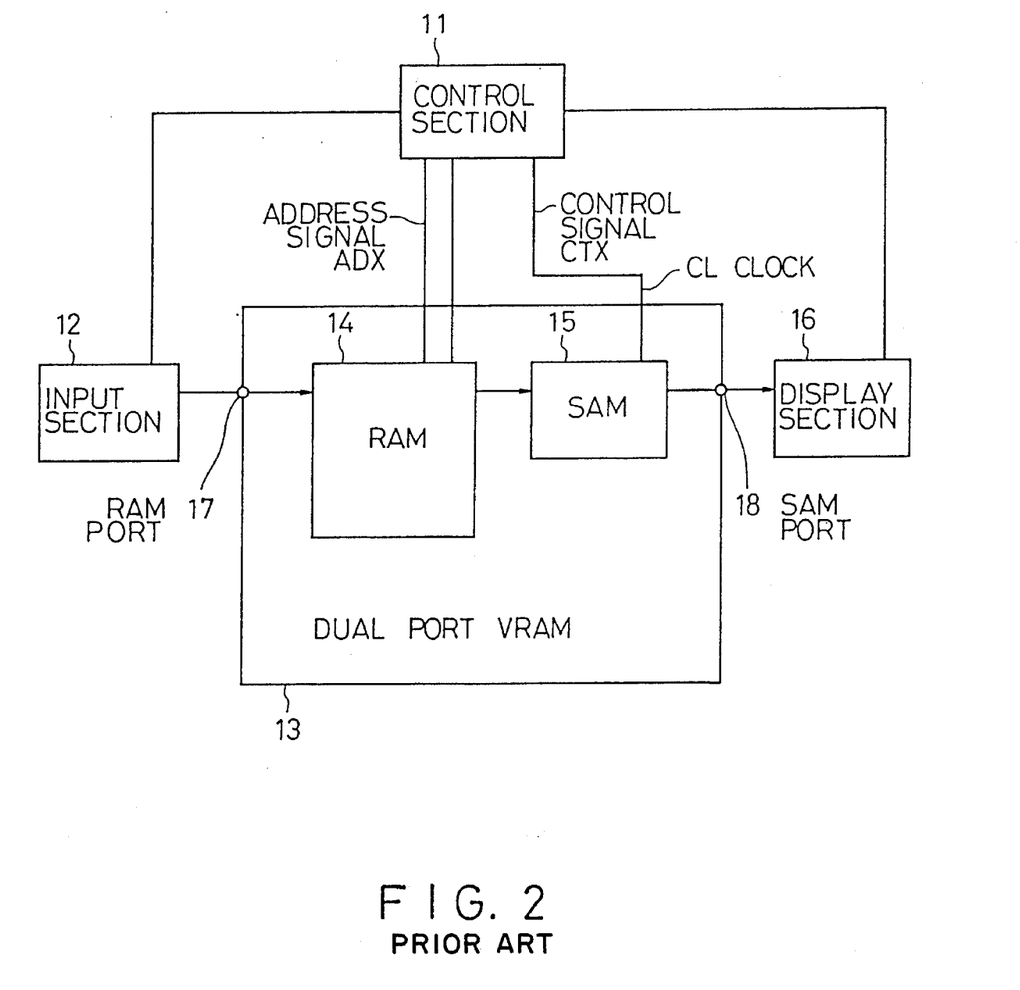
FIG. 2 is a schematic view of a conventional display signal output system.

FIG. 2 shows a configuration of a conventional image signal output system. In the figure, a control section 11 controls the whole image signal output system. An input section 12 inputs image signals to a dual port video RAM 13. The input section consists of, for example, a signal processor.

The dual port video RAN (hereinafter abbreviated to VRAM) 13 is a large integrated circuit consisting of a RAM 14 for storing image signals for one screen and a serial access memory (hereinafter abbreviated to SAM) 15. The SAM 15, consisting of a shift register, reads image signals for one scanning line and outputs them as serial signals. A display section 16 displays the image signals outputted from the SAM 15 of the VRAM 13. A RAM port 17 is a terminal used when the image signals are written in the RAM 14. A SAM port 18 is a terminal used when the image signals are read from the SAM 15.

ADX denotes an address signal line through which an address signal for specifying the address of the RAM is sent from the control section 11 to the RAM 14. CTX denotes a control signal line through which a control signal for controlling the operation of the RAM 14 is sent from the control section 11 to the RAM 14. CL denotes a clock line through which a clock signal used for the shift operation of the SAM 15 is sent from the control section 11 to the SAM 15.

In the normal application mode of VRAM 13, the image signals for one screen are written in the RAM 14 through the RAM port 17, the image signals for one scanning line are transferred from the RAM 14 to the SAM 15, and the image signals transferred to the SAM 15 are read out through the SAM port 18.

To transfer the image signals for one scanning line from the RAM 14 to the SAM 15, the control section 11 outputs a row address which specifies a row in the RAM 14 in which the image signals for one scanning line to be transferred are stored to, the RAM 14 through the address signal line ADX. The control section 11 outputs the control signals for instructing the transfer to the RAM 14 via the control signal line CTX.

The period of time required for transferring the image signals for one scanning line from the RAM 14 to the SAM 15 is, for example, about 200 nanoseconds when the capacity of the RAM 14 is 1 megabit and the image signals for one scanning line constitute 1 kilobit.

The operation of the display signal output system shown in FIG. 2 now be described. First, the image signals for one screen are written in the RAM 14 from the input section 12 through the RAM port 17.

When the image signals for one screen are written in the RAM 14, the control section 11 transfers the image signals for one scanning line form the RAM 14 to the SAM 15. The period of time required for transferring from the RAM 14 to the SAM 15, being as short as about 200 nanoseconds, has no effect on the cycle of writing the image signals in the RAM 14.

The image signals for one scanning line transferred to the SAM 15 are sequentially sent to the display unit 16 from the SAM 15 through the SAM port 18 in accordance with the clock signal supplied from the control section 11 to the SAM 15, and the transferred image signals are displayed on the display section 16.

As described above, the image signals for the display section have so far been generated directly by the output from the SAM port 18 of the VRAM 13 which retains the image signals at the workstation.

However, there is a desire that the output result be displayed on a conventional TV set having a different display system or recorded in a VTR for presentation or the like, in addition to a desire that the output be displayed on a display unit (that is, the display section 16) at a workstation.

In this case, it is necessary that the VRAM 13 in the conventional image signal output system be read from different address at a different period and a plurality of image signals be sent.

However, the conventional system has a problem in that the image signals cannot be outputted simultaneously to a plurality of display units having a different scanning period since the SAM 15 of the VRAM 13 can retain only the image signals for one scanning line at a time.

SUMMARY OF THE INVENTION

A first object of the present invention is to provide a graphic display control system which prevents the disorder of images on a display screen generated when the display screen of the unit is updated. display A second object of the present invention is to provide a graphic display control system which can output image signals to a plurality of display units having different synchronization systems simultaneously.

To achieve the above first object, there is provided a graphic display control system comprising: image display means whose display screen is composed of a plurality of pixels or character sections; at least two image storage units each of which has a storage capacity for one display screen of the image display units; two image selection information storage units which store image selection information for selecting one of the at least two image storage units for one pixel or one character section composing one display screen of the image display units; a selection information output units which selects one of the two image selection information storage units and outputs the image selection information stored in the selected image selection information storage units; and an image selection output units which selects one of the at least two image storage units for one pixel or one character section on the basis of the image selection information outputted by the selection information output units, and outputs the image information stored at the pixel position or character position corresponding to the selected image storage units to the image display means.

To achieve the above second object, there is provided a graphic display control system comprising: a dual port video RAM for storing image signals; a plurality of image signal retaining units which are disposed corresponding to the plurality of image display units to retain the image signal read from the dual port video RAM and output it to the corresponding image display unit; and an image signal output units which reads an image signal from the dual port video RAM on the basis of each synchronization signal of the plurality of image display units and allows the corresponding image signal retaining units of the aforesaid image signal retaining units to retain the read image signal.

Further, to achieve the above second object, there is provided a graphic display control system comprising: graphic information retaining units which simultaneously retain graphic information on a plurality of screens inputted sequentially from a frame memory; synthesis conversion units which synthesizes graphic information on a plurality of screens sent from the graphic information retaining units, outputs first synthesized graphic information, converts the first synthesized graphic information into a first video signal, and outputs it to the first display unit; and a conversion output unit which converts the first synthesized graphic information outputted from the synthesis conversion unit second synthesized graphic information having a transfer speed different from that of the first synthesized graphic information, and converts the second synthesized graphic information into the second video signal, and outputs it to a second display unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The embodiments of the present invention will be described below with reference to the drawings. Line parts will be referred to with like reference numerals.

Figure 3:
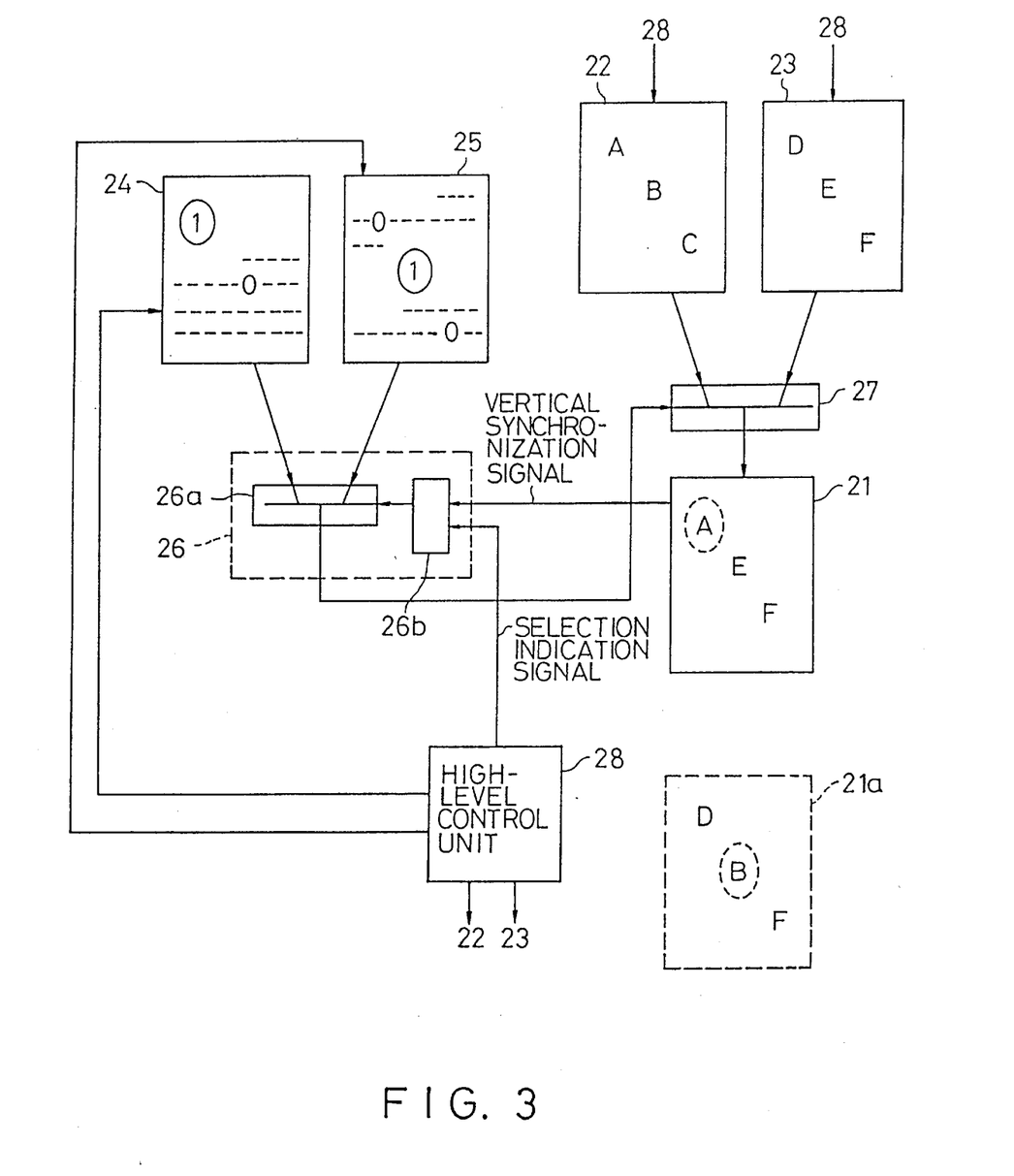
FIG. 3 is a block diagram which shows the configuration of a first embodiment of the present invention.

FIG. 3 is a block diagram showing a configuration of a first embodiment of the present invention. In the figure, a display unit 21 is an image display unit consisting of a CRT display. Frame memories 22 and 23, consisting of a bit map memory or a code memory having a memory capacity of one screen each, retain image information for each displayed window.

Frame selection control memories 24 and 25 store frame selection information for each pixel or each character section, as to which of the outputs of frame memories 22 and 23 should be selected. Concerning frame selection information, for example as shown in FIG. 3, the value "1" is stored for the portion which selects the frame memory 22, and value "0" is stored for the portion which selects the frame memory 23 for each pixel or character section.

A frame selection means 26, consisting of a multiplexer 26a and a latch 26b, selects one of the outputs of the frame selection control memories 24 and 25. The multiplexer 26a selects one of the outputs of the frame selection control memories 24 and 25 on the basis of the selection indication signal sent from the latch 26, and outputs the frame selection information stored in the selected frame selection control memory. The selection indication signal, which indicates which of the frame selection control memories 24 and 25 should be selected, is outputted from a high-level control unit 28. The latch 26b receives the selection indication signal from the high-level control unit 28 and also receives a vertical synchronization signal from the display unit 21. When the selection indication signal is received, the latch 26b latches such signal waits for a vertical synchronization signal from the display unit 21 which is inputted afterward, and outputs the latched selection indication signal to the multiplexer 26a at the time when the vertical synchronization signal is received.

The frame selection unit 27, consisting of a multiplexer, selects one of the image data read from the frame memories 22 and 23 on the basis of the frame selection information sent from the multiplexer 26a.

The information stored in the aforementioned frame memories 22 and 23 and frame selection control memories 24 and 25 is rewritten by the high-level control unit 28 at the blanking period of the synchronization signal. In particular, regarding the rewriting of the stored information in the frame selection control memories 24 and 25, during the time when an image is displayed on the basis of the frame selection information of, for example, the frame selection control memory 24, new frame selection information is written in the frame selection control memory 25 by way of the high-level control unit 28. When writing is completed, the high-level control unit 28 sends a selection indication signal to the latch 26b to indicate that the frame selection control memory 25 should be selected.

Next, the operation of the first embodiment described above will be described.

In FIG. 3, it is first assumed that the frame selection unit 26 selects the frame selection control memory 24, and outputs the stored information to the frame selection means 27. In this case, the image information of the frame memory 22 is selected for the portion in which value "1" is stored in the frame selection control memory 24, and the image information of the frame memory 23 is selected for the portion in which value "0" is stored, and the image information is displayed on the screen of the display unit 21. Namely, as shown in the block of the display unit 21 in FIG. 3, only "A" of the frame memory 22 is window displayed in the image of the frame memory 23, and the images of A, E, and F are displayed.

Here, it is assumed that new frame selection information is written in the frame selection control memory 25 by means of the high-level control unit 28 during the time when the information is displayed on the basis of the information of the frame selection control memory 24, In this case, when the writing is completed, the selection indication signal is outputted from the high-level control unit 28 to the latch 26b, and temporarily retained in the 26b. Then, the latch 26b outputs the selection indication signal to the multiplexer 26a at the time when it receives a vertical synchronization signal sent from the display unit 21. The multiplexer 26a outputs new frame selection information of the frame selection control memory 25, in accordance with the selection indication signal, to the frame selection unit 27. Thus, only "B" of the frame memory 22 is window displayed in the image of the frame memory 23, and D, B, and F are displayed as shown in the display screen 21a of the display unit 21 indicated by the broken line in FIG. 3.

Figure 4:
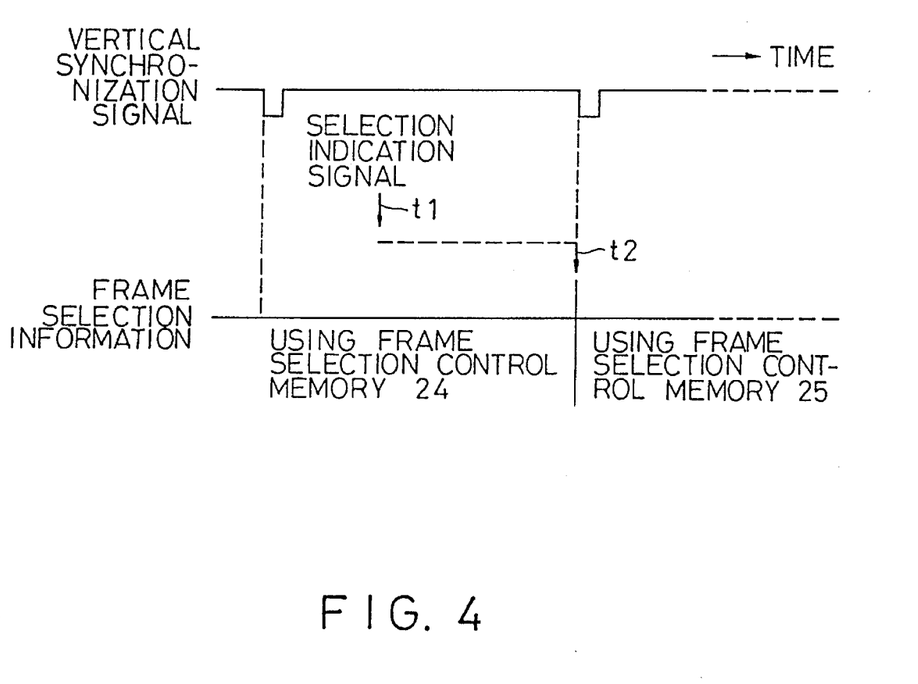
FIG. 4 is a timing chart which illustrates switching operations of a frame selection control memory according to the present invention.

FIG. 4 is a timing chart which illustrates the switching from the frame selection information of the frame selection control memory 24 to new frame selection information of the frame selection control memory 25. At time t1, a selection indication signal is generated to indicate that the frame selection control memory 25 should be selected. However, the image is still displayed on the basis of the frame selection information of the frame selection control memory 24. Afterward, at time t2, when a vertical synchronization signal is generated, the image is first changed over into new frame selection information of the frame selection control memory 25.

Accordingly, the switching between the frame selection control memories 24 and 25 is performed by time synchronizing the vertical synchronization signal, so that the screen is renewed from the first horizontal scanning at the upper left of the display screen of the display unit 21, thereby providing an easy-to-see screen.

Although two frame memories are disposed in the above-described first embodiment, the number of frame memories is not limited to two; three or more frame memories may be disposed. Moreover, the frame selection information stored in the frame selection control memory may be set to three or more values corresponding to each frame memory.

Also, the following configuration may be used: The frame selection units 26 and 27 do not use a multiplexer, and an enable signal is supplied to, for example, the memory to be selected, and a disable signal is supplied to the other memory.

Now, a second embodiment of the present invention, which can output image signals to two display units having a different synchronization system, will be described.

Figure 5:
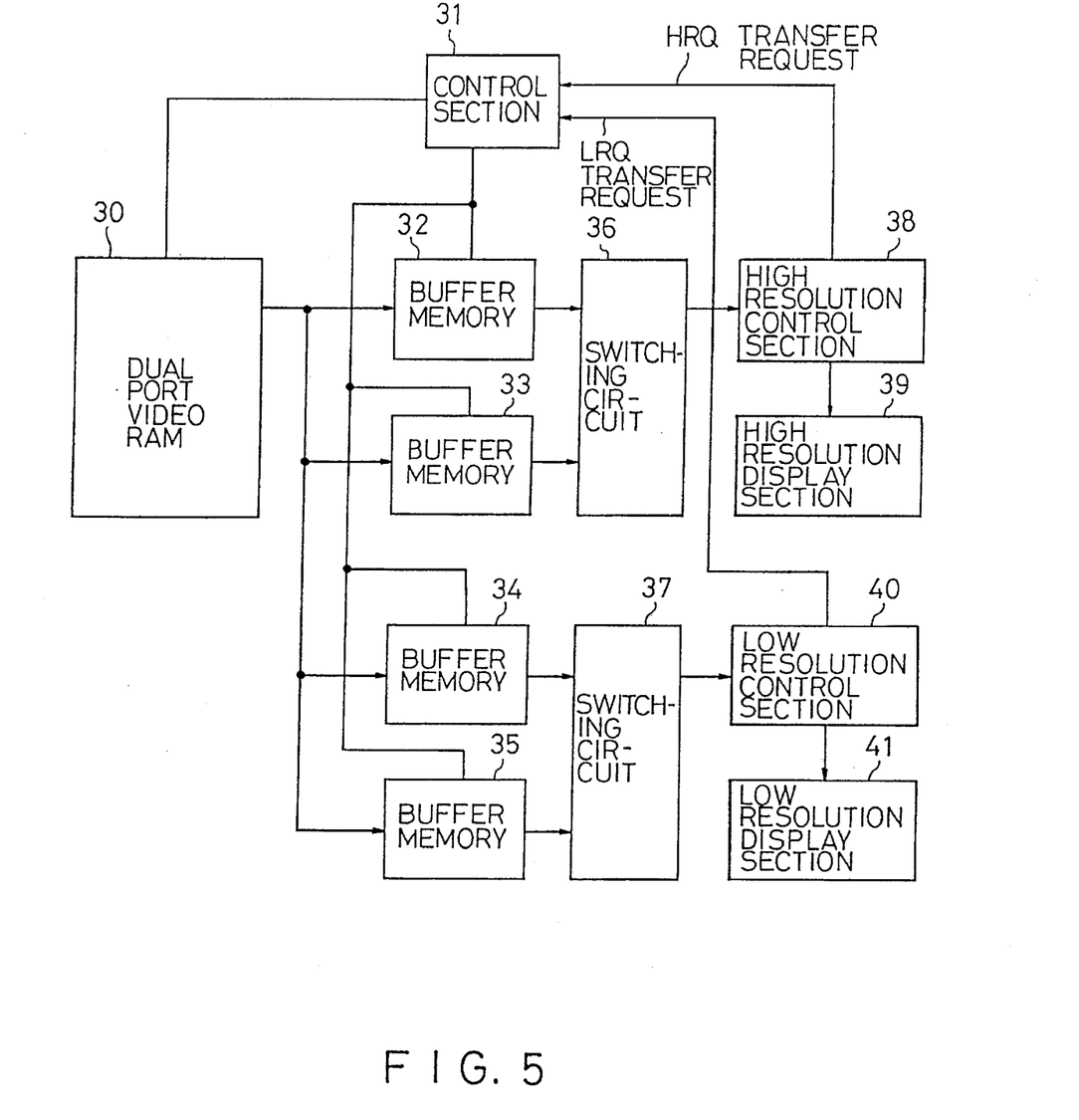
FIG. 5 is a block diagram which shows the configuration of a second embodiment of the present invention.

FIG. 5 is a block diagram of a second embodiment. In the figure, a dual port video RAM (hereinafter abbreviated to VRAM) 30 has the same configuration as that of the dual port video RAM 13 shown in FIG. 2. A control section 31 has the same function as that of the control section 11 as shown in FIG. 2, but additionally, has other functions described below. Therefore, the explanation is omitted on the configuration of the VRAM 30 and the function of the control section 31.

Buffer memories 32, 33, 34, and 35, each consisting of a shift register, retain the image signals for one scanning line which are outputted from a SAM of the VRAM 30. Reference numerals 36 and 37 denote switching circuits. The switching circuit 36 fetches either one of the outputs of the buffer memories 32 and 33, while the switching circuit 37 fetches either one of the outputs of the buffer memories 34 and 35. The outputs of the duplicated buffer memories are switched by the switching circuit for each scanning period, by which, during the time when one buffer memory reads the image signals for one scanning line to display the image, the other buffer memory writes the image signal for the next one scanning line. Thus, two buffer memories share the function to realize high-speed processing. The switching of the input side between the buffer memories 32 and 33 and the buffer memories 34 and 35 is performed by way of a control section 31.

A high resolution control section 38 controls the operation of a high resolution display section 39. The high resolution display section 39 is a high resolution display unit for a workstation having a pixel arrangement of 1280×1024 pixels.

A low resolution control section 40 controls the operation of a low resolution display section 41. The low resolution display section 41 is a low resolution display unit which displays an image signal of the NTSC type system having pixels of 640×480.

The high resolution control section 38 outputs the transfer request signal HRQ, which requests the control section 31 to transfer the image signal, to the control section 31 on the basis of the horizontal synchronization signal and vertical blanking period signal of the high resolution display section 39 supplied from the high resolution display section 39. Similarly, the low resolution display section 40 outputs the transfer request signal LRQ, which requests the control section 31 to transfer the image signal, to the control section 31 on the basis of the horizontal synchronization signal and vertical blanking period signal of the low resolution display section 41 supplied from the low resolution display section 41.

Figure 6:
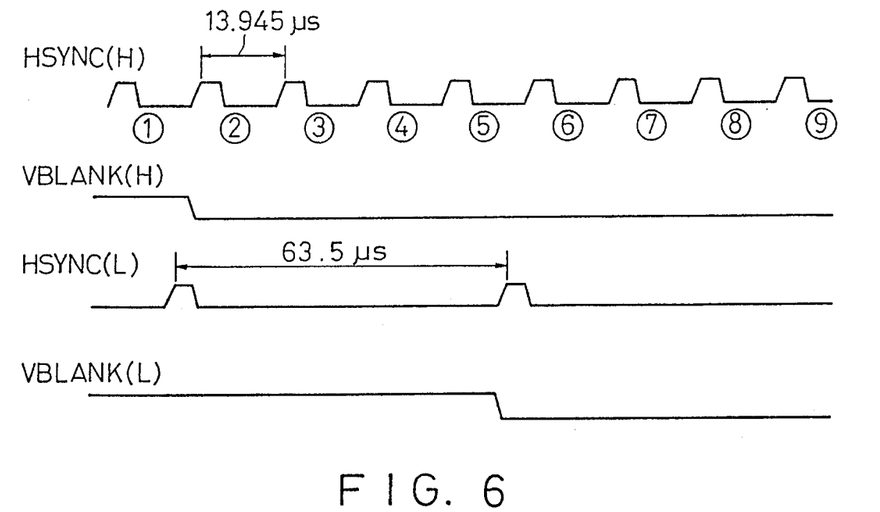
FIG. 6 is a timing chart of a horizontal synchronization signal and vertical blanking period signal supplied from a high resolution display section to a high resolution control section and from a low resolution display section to a low resolution control section.

FIG. 6 is a timing chart of the horizontal synchronization signal and vertical blanking period signal supplied from the high resolution display section 39 to the high resolution control section 38 and from the low resolution display section 41 to the low resolution control section 40. In the figure, HSYNC(H) and HSYNC(L) denote the horizontal synchronization signal at a high resolution display section 39 and the Low resolution display section 41, respectively. VBLANK(H) and VBLANK(L) denote the vertical blanking period signal at the high resolution display section 39 and the low resolution display section 41, respectively.

For example, HSYNC(H) is generated every 13.945 microseconds, and HSYNC(L) is generated every 63.5 microseconds. When VBLANK(H) and VBLANK(L) are at the low level, image is displayed at the high resolution display section 39 and the low resolution display section 41. VBLANK(H) and VBLANK(L) inputted to the high resolution control section 38 and the low resolution control section 40 become at the low level one horizontal scanning period before the time when an image is actually displayed because the image signal is read out in advance.

The control operation of the control section 31 will be described with reference to FIGS. 7 through 9.

Figure 7:
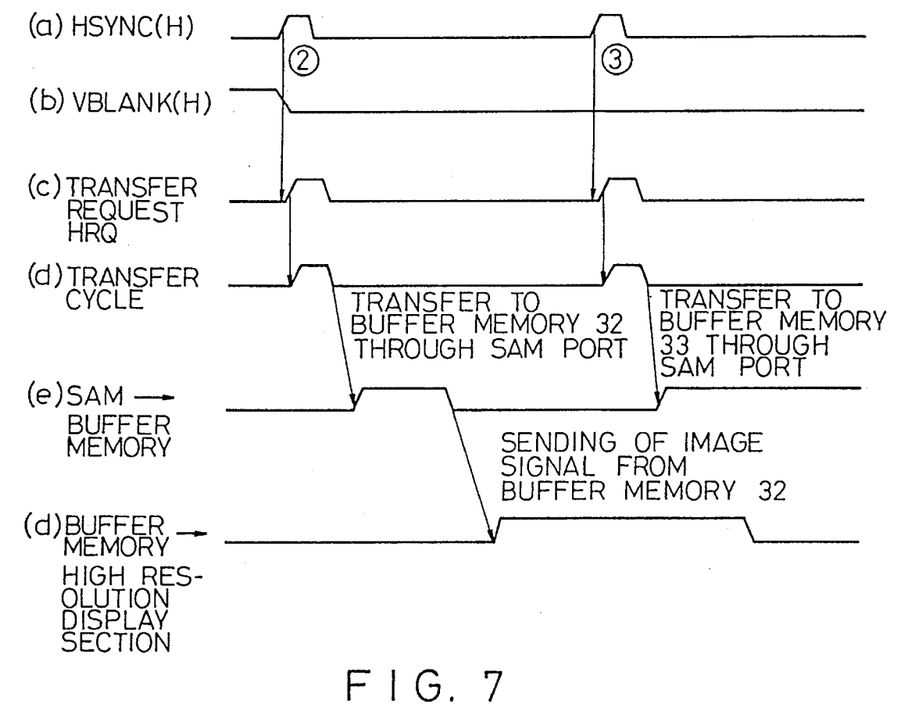
FIG. 7 is a timing chart which shows the transfer of an image signal to a high resolution display section on the basis of a transfer request signal HRQ.

FIG. 7 is a timing chart which illustrates the transfer of image signals to the high resolution display section 39 on the basis of the transfer request signal HRQ.

At time (2) when VBLANK(H) ((b) in the figure) is at the low level and HSYNC(H) ((a) in the figure) is at the high level, the high resolution control section 38 outputs the transfer request signal HRQ ((c) in the figure) to the control section 31. The control section 31 gives a row address corresponding to the image signals for one scanning line to be sent to the high resolution display section 39, to the RAM of the VRAM 30 in accordance with the input of the transfer request signal HRQ, and performs transfer from the RAM to the SAM ((d) in the figure) in accordance with the control signal.

The image signal read from the SAM of the VRAM 30 through the SAM port is transferred to the buffer memory 32 ((e) in the figure). When the transfer from the RAM to the SAM is completed, the transfer request signal HRQ is reset by a completion notification signal sent from the control section 31 to the high resolution control section 38.

The period of time required for the transfer from the SAM to the buffer memory 32 is 7.68 microseconds when the capacity of the VRAM 30 is 1 megabit and the image signal of 256 pixels is transferred in 30 nanoseconds. Therefore, a transfer is completed in one horizontal scanning period of 13.945 microseconds. By sending the image signals in the buffer memory 32 to the high resolution display section 39, the image signals for one scanning line are displayed on the high resolution display section 39 ((f) in the figure).

During the time when the signals are read from the buffer memory 32, at timing (3) when VBLANK(H) ((b) i n the figure) is at the low level and HSYNC(H) ((a) in the figure) is at the high level, the image signals for a next one scanning line are transferred to the buffer memory 33 through the SAM port of the VRAM 30, and written in the buffer memory 33. Afterward, the image signals are similarly sent from the buffer memory 33 to the high resolution display section 39, and displayed on the high resolution display section 39. Thus, the image is displayed on the high resolution display section 39 by alternately performing transfers using buffer memories 32 and 33.

As shown at time (6) in FIG. 6, when VBLANK(L) of the low resolution display section 41 is at the low level and HSYNC(L) is at the high level, the image signal must also be sent to the low resolution display section 41. The image signal is sent to the low resolution display section 41 by dividing the image signals for one scanning line into two times (split transfer), by which the time for waiting for the sending of an image signal to the high resolution display section 39 is shortened during the time when the image signal is sent to the low resolution display section 41. This operation will be described with reference to FIG. 8.

Figure 8:
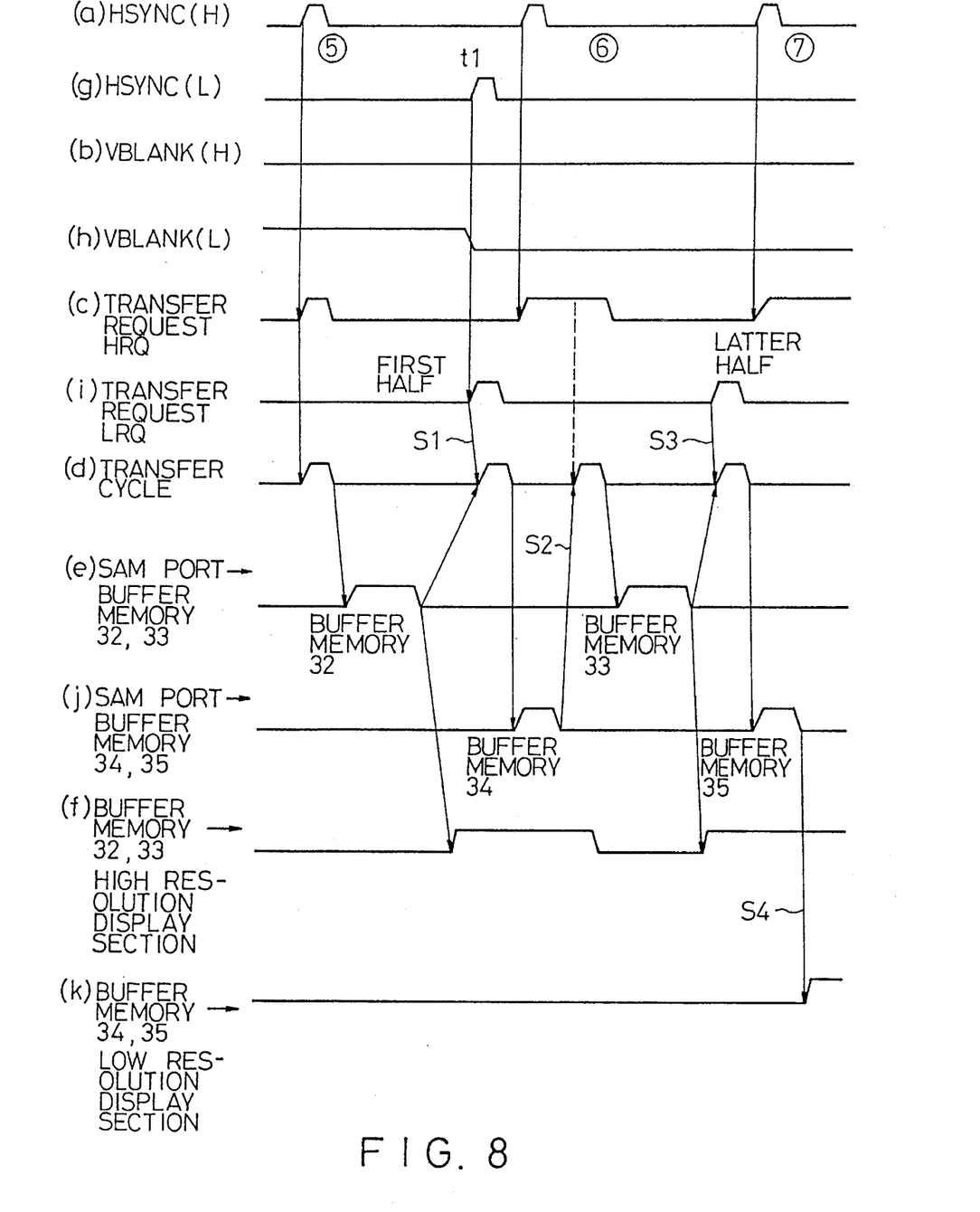
FIG. 8 is a timing chart which shows the transfer of an image signal to a high resolution display section and a low resolution display section in the case where a transfer request signal LRQ is added to a transfer request signal HRQ.

FIG. 8 is a timing chart which shows the transfer of an image signal to the high resolution display section 39 and to the low resolution display section 41 in the case where the transfer request signal LRQ is added to the transfer request signal HRQ.

At time (5), the transfer request signal HRQ ((c) in the figure) from the high resolution control section 38 is generated before the transfer request signal LRQ ((i) in the figure) from the low resolution control section 40 is generated. Therefore, the transfer to the buffer memory 32 ((e) in the figure) is performed through the SAM port of the VRAM 30. It is assumed that after the transfer is completed, the transfer request signal LRQ from the low resolution control section 40 is generated at time t1. Namely, when VBLANK(L) of the low resolution display section 41 is at the low level and HSYNC(L) is at the high level, the transfer request signal LRQ is outputted from the low resolution control section 40 to the control section 31. Accordingly, the control section 31 makes the VRAM 30 perform the first half cycle of the split transfer operation (arrow S1), sends the image signals for the first half portion of one scanning line from the RAM to the SAM, and transfers these signals from the SAM to the buffer memory 34 through the SAM port. In this case, the transfer time from the SAM port of the VRAM 30 to the buffer memory 34 is 3.84 microseconds, a half of the transfer time to the buffer memory 32 or the buffer memory 33, since a split transfer operation is performed.

During the transfer to the buffer memory 34, time (6) is reached where about the transfer to the high resolution display section 39 becomes necessary. This transfer to the high resolution display section 39 is performed after waiting until the transfer to the buffer memory 34 is completed (arrow S2), and the signal is transferred to the buffer memory 33.

After the transfer to the buffer memory 33 is completed, the control section 31 makes the VRAM 30 perform the latter half of the cycle of split transfer (arrow S3), sends the image signals for the latter half portion of one scanning line to the SAM from the RAM, and transfers them from the SAM to the buffer memory 34 through the SAM port. Thus, the image signals for one scanning line combining the first and latter half portions are sent from the buffer memory 34 to the low resolution display section 41 (arrow S4).

As described above, a split transfer is performed to transfer the image signal to the low resolution display section 41 since one horizontal scanning period of the high resolution display section 39 is short.

Figure 9:
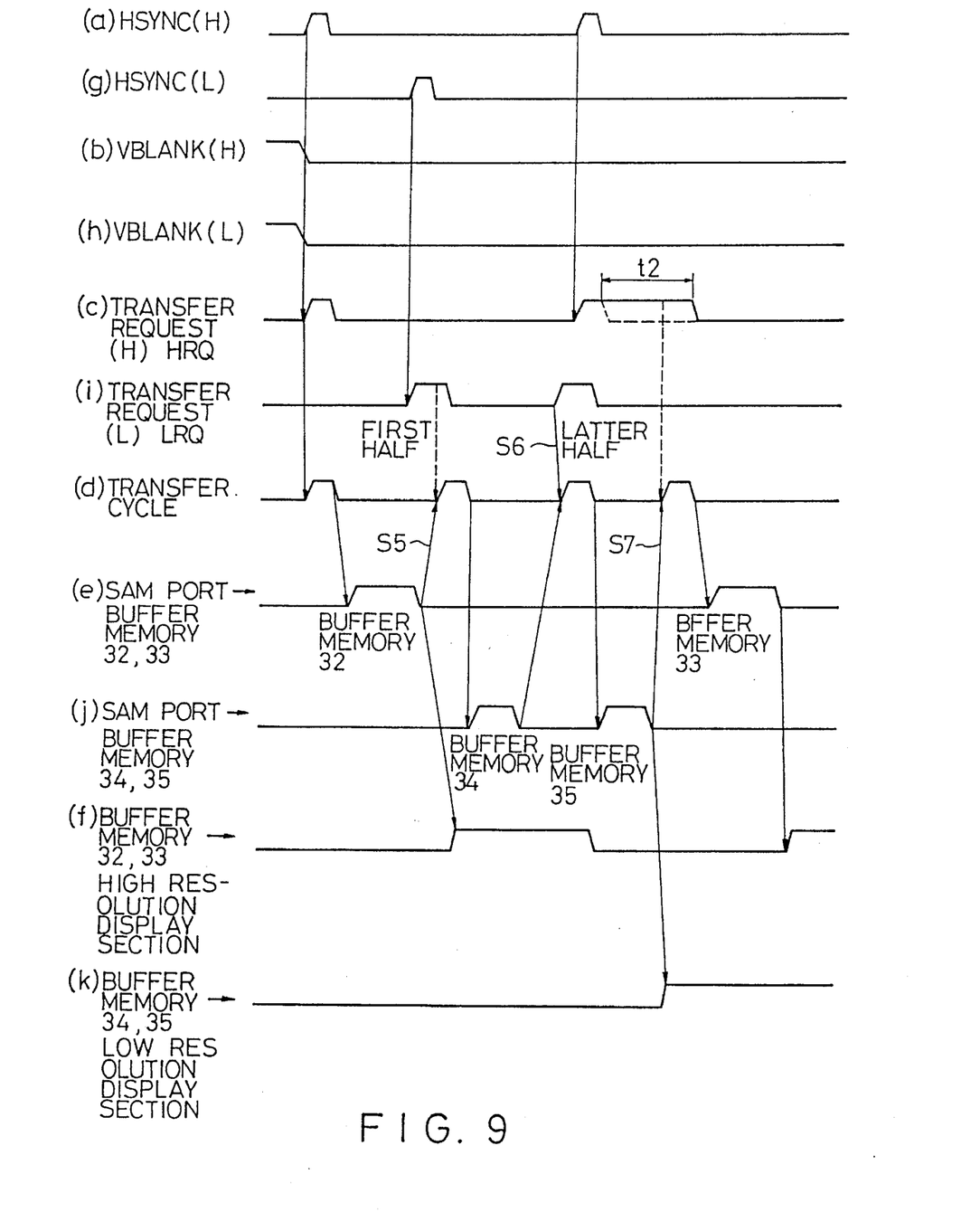
FIG. 9 is a timing chart which shows the transfer of an image signal to a high resolution display section and low resolution display section in the case where the occurrence sequence of transfer request signals HRQ and LRQ differs from that in FIG. 8.

FIG. 9 is a timing chart which shows the transfer of image signal to the high resolution display section 39 and the low resolution display section 41 in the case where the occurrence sequence of transfer request signals HRQ and LRQ differs from that in FIG. 8.

In this figure, the transfer request signal LRQ ((i) in the figure) is outputted to the control section 31 during the transfer to the buffer memory 32. For this transfer request, the control section 31 waits until the transfer to the buffer memory 32 is completed. After the transfer to the buffer memory 32 is completed, the control section 31 makes the VRAM 30 perform the split transfer of the first half (arrow S5), and send the image signals for the first half portion of one scanning line to the buffer memory 34. After the split transfer of the first half is performed, the VRAM 30 succeedingly performs the split transfer of the latter half (arrow S6) because of the absence of the transfer request signal HRQ, thereby the image signals for the latter half portion of one scanning line being sent to the buffer memory 34.

During the transfer of the image signals of the latter half portion, the transfer request signal HRQ ((c) in the figure) is outputted to the control section 31. This request is received after the transfer of image signals of the latter half portion to the buffer memory 34 is completed (arrow S7), and the image signals for one scanning line is sent to the buffer memory 33. Thus, the transfer request signal HRQ is extended by a time of t2 shown in the figure until it is received.

As described above, the image signal is fetched from the VRAM 30 to the buffer memories 32 through 35 in accordance with each synchronization system of the high resolution display section 39 and the low resolution display section 41 by the control of the control circuit 31. As a result, the image signal can be supplied simultaneously to the high resolution display section 39 and the low resolution display section 41 having a different synchronization system.

In the above second embodiment, a case where the image signal is supplied simultaneously to two display sections of the high resolution display section 39 and the low resolution display section 41 was described. However, three or more display sections having different synchronization systems may be disposed so that the image signal may be supplied to them simultaneously.

Although two buffer memories are disposed on each the side of high resolution display section 39 and the side of low resolution display section 41, one buffer memory may be disposed on each side when the processing speed of writing and reading of the buffer memory is high.

Now, a third embodiment of the present invention in which the image signal can be outputted to two display units having different display systems will be described.

Figure 10:
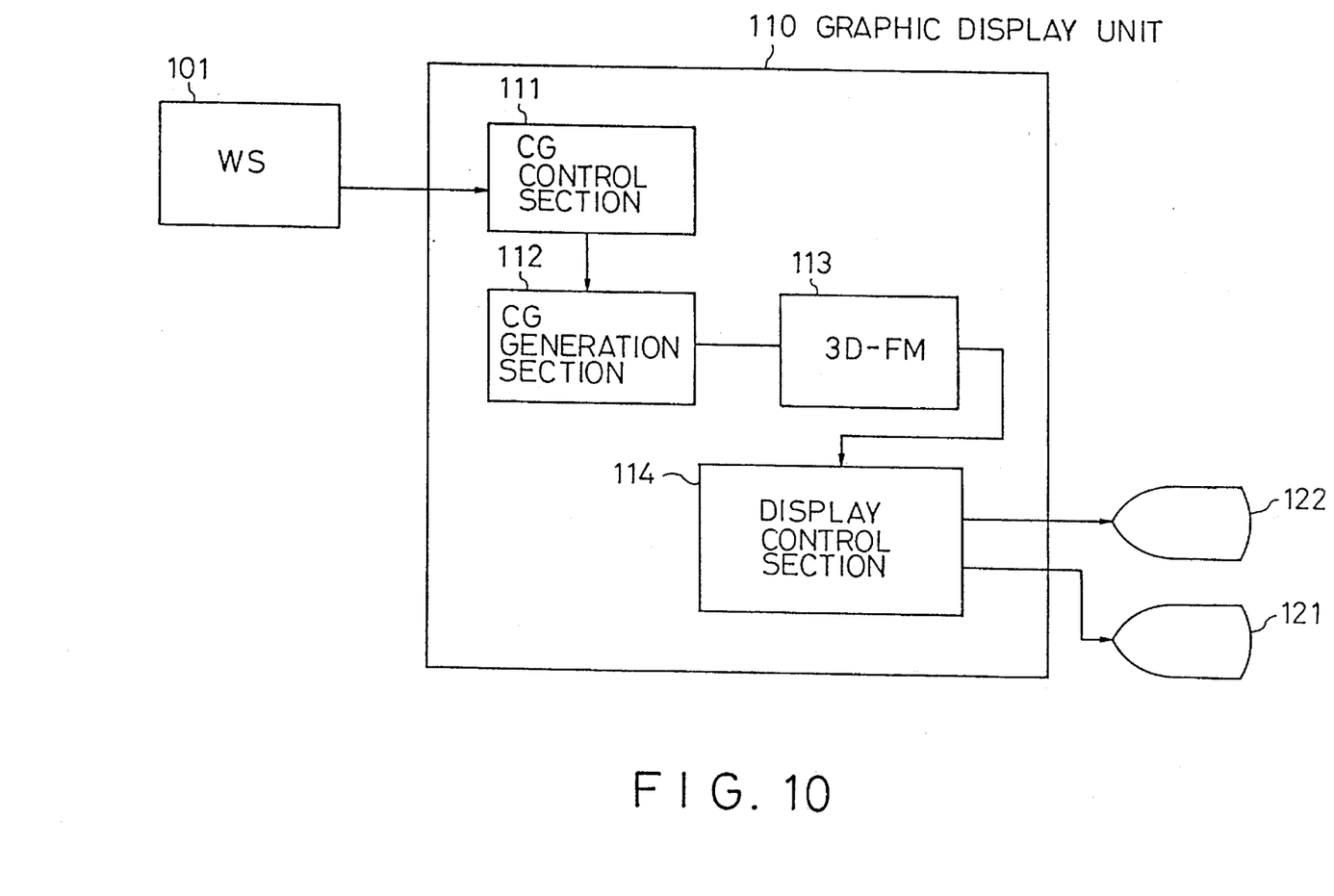
FIG. 10 is a diagram which shows the configuration of a graphic display unit including a workstation.

FIG. 10 is a diagram which shows the entire configuration of a graphic display system including a workstation. Graphic definition data is sent from a workstation 101 to a graphic display unit 110. Incidentally, the graphic definition data includes the information about the characters and figures to be displayed and their positions, but is not of a form which can be displayed as it is on the display unit.

The graphic display unit 110 receives the graphic definition data, and generates graphic information which can be displayed. Then, it converts the graphic information into a video signal, and displays it on display units 121 and 122.

The graphic display unit 110 comprises a CG (computer graphics) control section 111, a CG generation section 112, a frame memory for plotting three-dimensional data (3D-FM), and a display control section 114.

The CG control section 111 receives graphic definition data from the workstation 101 and sends it to the CG generation section 112. The CG control section 111 controls the transfer of data or the like in the whole of the graphic display unit 110.

The CG generation section 112 generates graphic information, that is, the dot data of the display image from the graphic definition data, and sends it to the frame memory for plotting three-dimensional data 113. For example, when the graphic definition data is a character, the CG generation section 112 generates the dot data of character from a character generator incorporated in the CG generation section 112, and outputs it. When the graphic definition data is a line such as a straight Line, the CG generation section 112 generates the dot data of the line on the basis of the specified position, length, and slope, and outputs it.

The frame memory for plotting three-dimensional data 113 can store the Z value (depth value) of each pixel. The frame memory for plotting three-dimensional data 113 consists, for example, of 1280 pixels transversely and 1024 pixels longitudinally, being constituted as a memory for storing the brightness data and the Z value for each pixel.

The display control section 114 reads the frame memory to be displayed from the frame memory for plotting three-dimensional data 113, synthesizes the content of the frame memory multiplexed with time, and outputs it as a video signal corresponding to the display unit.

For example, a display unit 121 is a display unit for a workstation in which the number of pixels for one screen is 1280×1024 and the screen is changed-over continuously at a rate of 76 frames per second. On the other hand, a display unit 122 is a NTSC type television set in which the number of pixels is 640×480 and the screen is changed-over at a rate of 60 frames per second by interlaced scanning.

Figure 11:
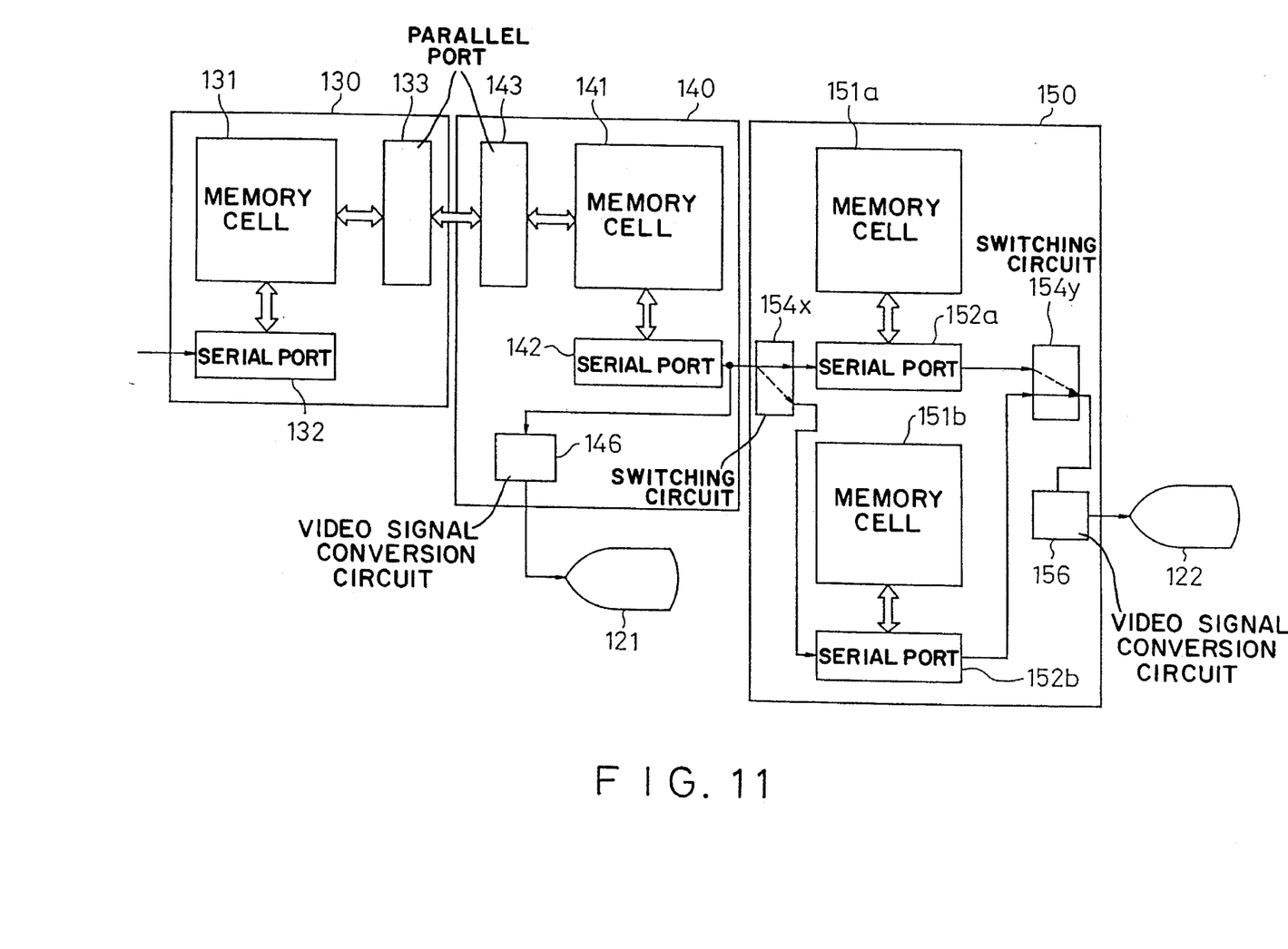
FIG. 11 is a diagram which shows the internal configuration of a display control section.

FIG. 11 is a diagram showing the internal configuration of the display control section 114. The display control section 114 comprises a transfer storage section 130, a display storage section 140, and a video section 150. The transfer of graphic information or the like between the transfer storage section 130, the display storage section 140, and the video section 150 is performed by a control section (not shown). Since the control section simply controls the transfer of data, the detailed description thereof is omitted.

The transfer storage section 130 consists of a dual port RAM including a memory cell 131, a serial port 132, and a parallel port 133. The graphic information from the frame memory for plotting three-dimensional data 113 is inputted through the serial port 132 and stored in the memory cell 131. The memory cell 131 is configured so that graphic information on a plurality of screens inputted sequentially is retained at the same time. The retained graphic information is outputted through the parallel port 133.

The display storage section 140 has a dual port RAM including a memory cell 141, a serial port 142, and a parallel port 143, and a video signal conversion circuit 146 for converting the graphic information into a video signal.

In the display storage section 140, the graphic information of a plurality of screens is outputted through the parallel port 133 of the transfer storage section 130 to the memory cell through the parallel port 143, and synthesized in the memory cell 141. The synthesized graphic information is outputted through the serial port 142 to the video signal conversion circuit 146, converted into a video signal by the video signal conversion circuit 146, and outputted to the display unit (display unit for workstation) 121. The synthesized graphic information outputted through the serial port 142 is transferred at a transfer speed corresponding to the display system of the display unit for the workstation. The synthesized graphic information from the serial port 142 is also sent to the video section 150.

The flow of graphic information in the transfer storage section 130 and the display storage section 140 wiLL be described with reference to FIG. 12.

Figure 12:
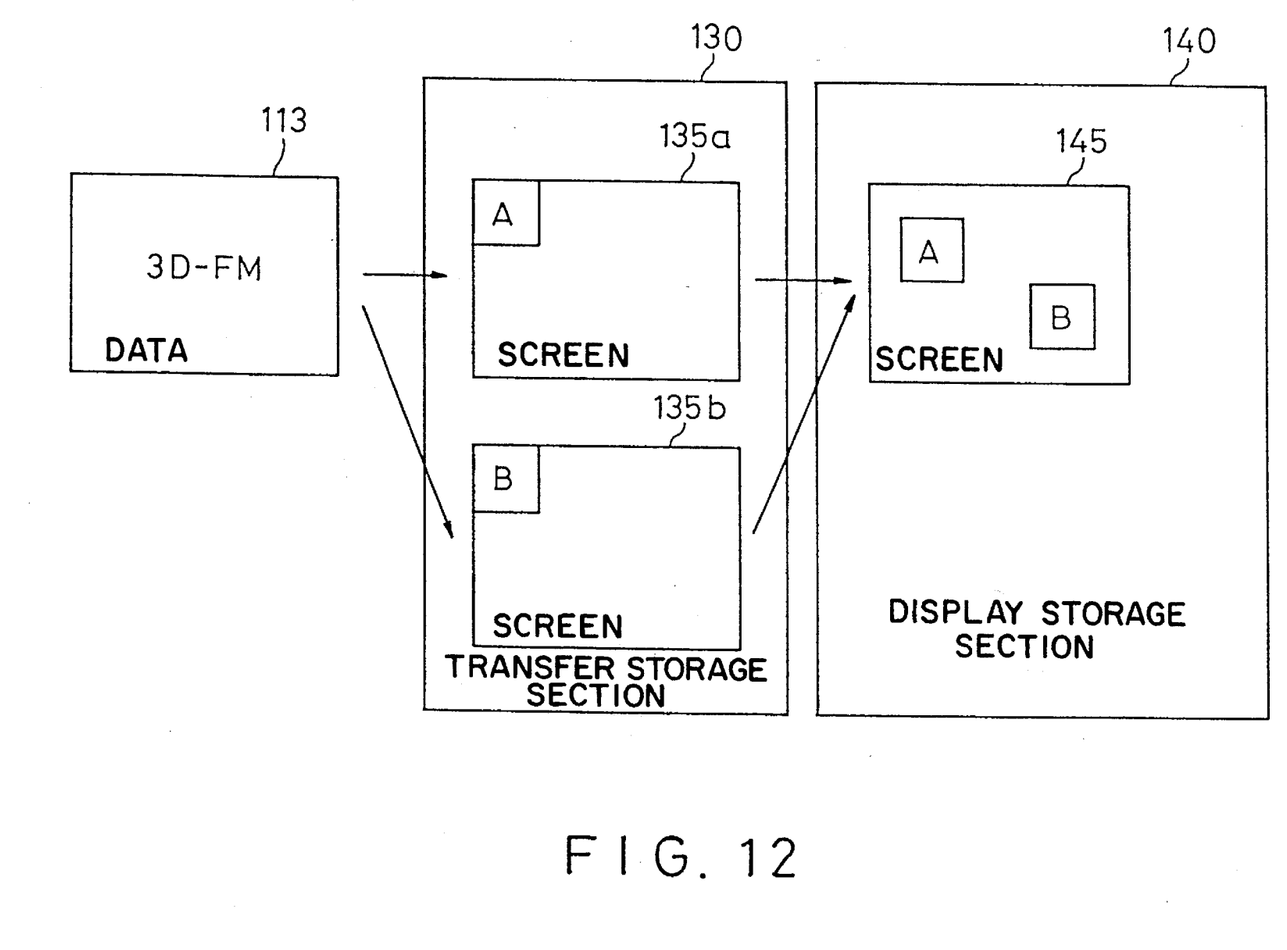
FIG. 12 is a diagram showing a typical flow of graphic information in a transfer storage section and a display storage section.

FIG. 12 is a diagram which shows a typical flow of graphic information in the transfer storage section 130 and the display storage section 140. The graphic information is transferred from the frame memory for plotting three-dimensional data 113 to the transfer storage section 130. The figure plotted in the frame memory for plotting three-dimensional data 113 changes every moment. In the transfer storage section 130, the graphic information of a plurality of screens inputted sequentially, for example, screens 135a and 135b are retained at the same time. In the display storage section 140, the screens 135a and 135b sent from the transfer storage section 130 are synthesized by multiplexing with time to provide one screen of synthesized graphic information 145. Namely, the transfer storage section 130 functions as a relay unit for transferring graphic information, by which the display storage section 140 performs the synthesis of images, thereby fulfilling the function of multi-window display.

Referring again to FIG. 11, the video section 150 will be described. The video section 150 has a configuration of a double buffer memory, consisting of a dual port RAM including a memory cell 151a, a serial port 152a, and a not illustrated parallel port, and a dual port RAM including a memory cell 151b, a serial port 152b, and a parallel port. To switch these two dual port (not shown) RAMs, a switching circuit 154x is connected on the input side of the serial ports 152a and 152b, while a switching circuit 154y is connected on the output side. To the switching circuit 154y, a video signal conversion circuit 156 is connected to convert the synthesized graphic information from the serial port 142 of the display storage section 140 into a video signal, and the output of the video signal conversion circuit 156 is connected to the display unit 122.

The synthesized graphic information from the serial port 142 is inputted to the switching circuit 154x. The switching circuit 154x is connected, for example, to the side indicated by a solid line. Therefore, synthesized graphic information is stored in the memory cell 151a through the serial port 152a. On the other hand, the switching circuit 154y is also switched to the side indicated by a solid line in this case. Therefore, the synthesized graphic information which has previously been read into the memory cell 151b is read out, and outputted to the video signal conversion circuit 156. Next, when the switching circuits 154x and 154y are switched to the side indicated by a broken line, the synthesized graphic information from the serial port 142 is inputted to the memory cell 151b through the serial port 152b. During this time, the synthesized graphic information stored in the memory cell 151a is outputted to the video signal conversion circuit 156 via the switching circuit 154y. In particular, the synthesized graphic information is written into one of the memory cells 151a and 151b, while the synthesized graphic information is read from the other. Therefore, the synthesized graphic information can be read at a reading speed corresponding to the display unit 122 having a low transfer speed.

Although two display units 121 and 122 are disposed in this third embodiment, the display unit is not disposed, and instead, two reading speeds at the video section are set, and a television set of NTSC system and a display unit for workstation may be used by switching as the display unit 122.

Also, although a dual port RAM is used as each buffer memory in the third embodiment, it is needless to say that another memory having a function equivalent to that of the dual port RAM may be used. For example, a shift register may be used in place of the dual port RAM of the video section 150.

Further, although a display unit for workstation is used as the display unit 121 and a television set for NTSC is used as the display unit 122 in the third embodiment, another display unit having a different display system such as a liquid crystal unit may be used.

In the third embodiment, as described above, a video section is disposed so that the transfer speed of the synthesized graphic information can be changed at the video section, thus allowing a plurality of display units having a different display systems to be used.

In addition, since the configuration of the present invention is such that the graphic information is received at the transfer storage section and synthesized at the display storage section, the graphic information from the frame memory for plotting three-dimensional data is synthesized, thereby the function of multi-window display being fulfilled.

The foregoing is considered as illustrative only of the principles of the present invention. Further, since numerous modifications and changes may be readily used by those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A graphic display control system which performs multi-window display, comprising:

image display means for providing a display screen composed of a plurality of pixels or character sections;

at least two image storage means for storing image information, each of said at least two image storage means having a storage capacity for the display screen of said image display means;

two image-selection-information storage means for storing image-selection information the image-selection information in each image-selection-information storage means selecting one of said at least two image storage means at every pixel or every character section of a portion of the display screen of said image display means;

selection information output means for receiving a selection indication signal, for selecting a first one of said two image-selection-information storage means according to the selection indication signal, and for outputting the image-selection information stored in the first one of said image-selection-information storage means;

control means for writing new image-selection information to a second one of said image-selection-information storage means, and for outputting the selection indication signal to said selection information output means to alternate selection between said two image-selection-information storage means when writing of the new image-selection information is completed; and image selection output means for selecting one of said at least two image storage means at every pixel or every character section based on the image-selection information outputted by said selection information output means, and for outputting the image information stored in the one of said at least two image storage means to said image display means.

2. A graphic display control system according to claim 1, wherein said image display means produces a vertical synchronization signal, and wherein after receiving the selection indication signal from said control means, said selection information output means selects the second one of said two image-selection-information storage means in synchronization with the vertical synchronization signal received from said image display means, and outputs the image-selection information stored in the second one of said image-selection-information storage means.

* * * * *